United States Patent [19]

Sasaki et al.

[11] Patent Number: 4,624,800
[45] Date of Patent: Nov. 25, 1986

[54] METHOD FOR PRODUCING AQUEOUS, LOW-ALKALI METAL, LOW-ALUMINA SILICA SOLS

[75] Inventors: Yutaka Sasaki; Toshio Nakamura; Hiroshi Murata; Yoshimi Nakamura, all of Kanagawa, Japan

[73] Assignee: Nitto Chemical Industry Co., Ltd., Tokyo, Japan

[21] Appl. No.: 679,719

[22] Filed: Dec. 10, 1984

[30] Foreign Application Priority Data

Dec. 10, 1983 [JP] Japan ................................. 58-232245

[51] Int. Cl.⁴ ............................................. B01J 13/00
[52] U.S. Cl. ............................ 252/313.2; 106/287.34; 252/314; 502/249; 502/408
[58] Field of Search ............................. 252/313.2, 314

[56] References Cited

U.S. PATENT DOCUMENTS

| | | | |
|---|---|---|---|
| 2,407,462 | 9/1946 | Whiteley | 252/314 |
| 2,574,902 | 11/1951 | Bechtold et al. | 252/313.2 |
| 2,978,349 | 4/1961 | Walsh et al. | 252/313.2 X |
| 3,281,216 | 10/1966 | Mindick et al. | 252/313.2 X |

FOREIGN PATENT DOCUMENTS

| | | | |
|---|---|---|---|
| 521741 | 2/1956 | Canada | 252/313.2 |
| 713211 | 8/1954 | United Kingdom | 252/313.2 |
| 1562491 | 3/1980 | United Kingdom | 252/314 |

Primary Examiner—Richard D. Lovering
Attorney, Agent, or Firm—Sughrue, Mion, Zinn, Macpeak, and Seas

[57] ABSTRACT

A method for producing an aqueous silica sol is described, comprising admixing a fine silica powder having an ultimate particle size of 5 to 200 millimicrons with an aqueous medium at a pH not higher than 5 while applying ultrasonic vibrations having a frequency within the range of from 10 to 100 kilohertz to the aqueous medium to thereby disperse said silica powder in said aqueous medium and thus convert the mixture into an aqueous sol.

16 Claims, No Drawings

METHOD FOR PRODUCING AQUEOUS, LOW-ALKALI METAL, LOW-ALUMINA SILICA SOLS

FIELD OF THE INVENTION

This invention relates to a method for producing low-alkali metal, low-alumina silica sols, and, more particularly, to a method for producing low-alkali metal, low-alumina silica sols which comprises admixing a silica powder with an aqueous medium having certain characteristics while applying specific ultrasonic vibrations to said aqueous medium.

BACKGROUND OF THE INVENTION

Silica sols are useful materials in wide commercial use in many fields such as the fiber, paper, casting, ceramic, and catalyst industries. In particular, silica sols are very useful in the catalyst manufacturing industry as catalyst constituents or carriers. However, for some catalytic reactions, the presence of sodium and/or alumina (or aluminum) components in catalysts is undesirable in many instances. Furthermore, to ultrahigh-silicate zeolites (used as shape-selective catalysts and or adsorbents, either by themselves or in combination with other catalyst components), the presence of sodium is sometimes detestable, and, in extreme instances, those zeolites in which the Si/Al (or $SiO_2/Al_2O_3$) ratio is infinite, namely, those absolutely free of alumina (or aluminum), are strongly desired. Regrettably, currently available silica sols are not so free of sodium and/or alumina (or aluminum) components as to meet all the above requirements, but contain, as impurities, sodium and alumina components (in certain instances, in unacceptable amounts). Therefore, establishment of a method for producing low-alkali metal, low-alumina, high-concentration silica sols at low cost would contribute not only to the catalyst manufacturing industry, but also various technical fields in which catalysts prepared using such silica sols are used.

Silica sols are colloidal suspensions in water of fine silica particles several millimicrons to several hundred millimicrons in primary or ultimate particle size. Commercially available silica sols are in most cases produced by using water glass (sodium silicate) as the starting material and subjecting this starting material to ion exchange, dialysis, ultrafiltration or gel peptization, for instance. Therefore, by any of these methods, the silica sols obtained contain typically certain amounts of sodium and alumina. Among commercial silica sols, some are claimed to be low-alkali metal and low-alumina; however, the sodium and alumina contents thereof are generally several hundred to several thousand and several hundred to ten and odd thousand ppm (parts per million parts), respectively, on the silica basis. As mentioned hereinabove, aqueous silica sols lower in sodium and/or alumina content are required for some purposes, but available commercial products do not satisfactorily meet requirements.

On the other hand, low-alkali metal, low-alumina silica powders are rather readily available on the market. It would be desirable to convert such silica powders into aqueous sols so as to obtain low-alkali metal, low-alumina silica sols. However, attempts to this end have failed so far.

For instance, several attempts to disperse fine silica powders obtained by hydrolytic combustion of silicon tetrachloride with a combustible gas (one of typical methods of producing high purity silica) in water are found in the prior art. However, these prior art techniques have all been unsatisfactory.

As one of the prior art techniques such as mentioned above, there is a proposal described in British Patent Specification No. 1,326,574 relative to the production of a dispersion of a fine silica powder relatively large in ultimate particle size and having good dispersibility. According to the proposal, silica particles of from 40 to 120 millimicrons in ultimate particle size are dispersed in water adjusted to a pH of at least 7 with an alkali metal hydroxide. However, this method allows contamination with alkali metals and moreover is not effectively applicable to silica powders of small particle size.

Other examples of the above-mentioned prior art techniques disclosing methods of forming such kinds of fine silica powders into an aqueous sol include U.S. Pat. Nos. 2,630,410 and 2,984,629. According to the former, the solation in water is effected in the presence of boric acid or an alkali metal borate in the aqueous medium, for the prevention of gelation of the resultant sol, whereas according to the latter, the solation in water is caused by the action of a mechanical shearing force (e.g., milling) in the presence of an alkali metal hydroxide (in an amount sufficient to make the pH of the aqueous sol 8.5 to 10.5) and a dispersing agent (arylsulfonic acid or alkylarylsulfonic acid). Both methods require addition of an auxiliary agent or agents for dispersion or stabilization to the water-silica powder mixture and such agents remain in the resulting sols as impurities. Therefore, these methods, too, fail to provide those silica sols that are very low in impurity content.

While the prior art techniques mentioned above use silica powders very high in purity, the use of an additive such as an alkali metal-containing substance as an auxiliary agent is unavoidable, because with such auxiliary agents it has been difficult to form said powders into aqueous sols. As a result, even so-called high purity silica powders are contaminated with additives as impurities.

There is also an example in which ultrasonic waves were applied in dispersing silicic acid gels. Experiments of this kind are reported in N. S. Bubyreva and B. P. Bindas, *Colloid J. USSR* (Engl.), Vol. 21, pp. 377–380 (1959). However, the starting material used in the experiments reported in the above-cited publication was not a fine silica powder as used in carrying out the present invention but was silicic acid precipitated from an acidic solution in a gel state. In addition, the ultrasonic waves used in said experiments for dispersing silicic acid gels to make up them into sols had considerably high frequencies of 1 to 8 megahertz (i.e., 1,000 to 8,000 kilohertz). As detailedly mentioned later herein, ultrasonic waves in such frequency range are not effective in the practice of the present invention. Moreover, the sols obtained in the Bubyreva et al. experiments had concentrations of only up to 5 g $SiO_2$/liter. Such concentrations are inadequately low for commercial use. For commerical application, silica sols should have a silica concentration of at least 15% by weight (about 150 g $SiO_2$/liter), and preferably from 20 to 30% by weight or higher. In these respects, the experiments described in the Bubyreva et al report cited above are quite distinct in object, constitution, and effects from the present invention, as will become clearer from the description below.

SUMMARY OF THE INVENTION

As a result of intensive investigations with the object of making up low-alkali metal, low-alumina, fine silica powders into high concentration aqueous sols, the present invention has now been discovered.

The present invention thus provides a method of producing aqueous silica sols which comprises admixing a fine silica powder having an ultimate particle size of 5 to 200 millimicrons with an aqueous medium at a pH not higher than 5 while applying ultrasonic vibrations to the aqueous medium to thereby disperse said silica powder in said aqueous medium and thus convert the mixture into an aqueous sol. According to this invention, there can be obtained silica sols which retain the high purity of the starting silica powder if purified water is used as the aqueous medium, since any additives such as an alkaline auxiliary agent are not used at all.

DETAILED DESCRIPTION OF THE INVENTION

In accordance with a preferred mode of practice of the invention, the ultrasonic waves to be used have frequencies in the range of from 10 to 100 kilohertz and the silica sols obtained have an $SiO_2$ concentration suited for commercial use, such as mentioned above.

Silica powders usable in practicing the invention have an ultimate particle size of from 3 to 200 millimicrons, and preferably from 5 to 50 millimicrons. Generally, when the ultimate particle size is below 3 millimicrons, even the method of the invention can scarcely give high concentration aqueous sols. When, conversely, the ultimate particle size exceeds 200 millimicrons, precipitation easily occurs and therefore only minimally stable sols can be formed.

The term "ultimate particle size" as used herein has the same meaning as the term commonly used in the industry. The ultimate particle size is generally expressed in terms of an arithmetic mean of the diameters of from 3,000 to 5,000 particles as measured on an electron photomicrograph. The methods for determining the "ultimate particle size" are described in *The Chemistry of Silica*, Ralph K. Iler, John Wiley & Sons, page 465.

As for the type of silica, amorphous silicic acid anhydride is particularly preferred, although it may in part be in the silicate form.

Silica powders having such properties as mentioned above can adequately be selected from among commercial products. It is convenient to select such silica powders from among those silicic acid anhydride, hydrated silica, hydrated silicate and the like species which are collectively and generally called "white carbon", and are used as rubber reinforcing agents.

These silica powders are produced by a variety of methods. Typical are the methods comprising:
(a) Oxidative decomposition of a silicic acid ester such as ethyl silicate;
(b) Hydrolysis of silicon tetrachloride;
(c) Combustion of silicon tetrachloride with a combustible gas;
(d) Pyrolysis or oxidative degradation of an organic silicon compound (e.g., alkylchlorosilane, alkoxysilane); and
(e) Decomposition of sodium silicate with an acid or an ammonium salt.

Silica powders obtained by the methods (a) to (d) are particularly suited for the production of low-alkali metal, low-alumina silica sols. By these methods, there can easily be obtained silica powders having a sodium content of less than 500 ppm (not more than 1 ppm in a much preferred embodiment) and less than 1,000 ppm in alumina content (not more than 10 ppm in a much preferred embodiment). Silica powders less than 500 ppm in sodium content and less than 1,000 ppm in alumina content are also readily available among commercial products.

For making up these silica powders into aqueous sols, the pH is required to be not higher than 5. At higher pH levels, the viscosity increase is so significant that stable sols can hardly be formed.

The pH should be not higher than 5, and preferably not higher than 4. The temperature may be selected within the range of from about 0° to 120° C. In most cases, room temperature is sufficient.

Desirably, the pH is maintained within the above range throughout the process of making aqueous sols. For pH adjustment, an inorganic acid such as hydrochloric acid, sulfuric acid or nitric acid, an organic acid such as formic acid or acetic acid, organic or inorganic bases such as aqueous ammonia or organic amines, and so on may be used as necessary. A temporary fluctuation of the pH to over 5, or temporary gelation resulting therefrom during operation, if the duration of such condition is short, is allowable and can be corrected by adjusting the pH to a value within the range according to the invention with an acid or base such as mentioned above, followed by continuing the process for solation.

Addition of the above-mentioned silica powder is conducted with the pH adjusted in the above manner. However, this measure alone generally leads to formation of nothing but low concentration sols. Even with powerful mechanical stirring, it is difficult to obtain sols higher in concentration than 10%.

However, it has been found that addition of a silica powder while applying ultrasonic vibrations to the water and maintaining the pH within the above-specified range according to the present invention provides the formation of stable silica sols having much higher concentrations.

Adding all the quantity of silica powder at once will result in a type of gelation and, as a result, more powerful and prolonged application of ultrasonic vibrations will be required for solation. Therefore, it is recommended to add the silica powder over a period of time (rather than instantaneously) while conducting ultrasonic vibration application.

Application of ultrasonic vibrations to the dry state silica powder before addition to water followed by addition thereof to water does not produce any effects at all. It is recommended to add the silica powder while applying ultrasonic vibrations to the aqueous medium.

Ultrasonic vibration application can be conducted by indirectly applying ultrasonic vibrations from outside the vessel, or by direct immersion of an ultrasonic transducer in the aqueous medium. Commerically available ultrasonic homogenizers used mainly for the purpose of emulsification can also be used with advantage for the above purpose.

An appropriate ultrasonic transducer can be selected from among various types of products commercially available for generating ultrasonic waves over a wide frequency range.

The ultrasonic frequency range is preferably from 10 to 100 kilohertz (KHz), and more preferably from 15 to 50 kilohertz (KHz).

The ultrasonic vibration energy applied to the aqueous medium is in approximately reverse proportion to the time required for silica sol formation to be complete. Therefore, an adequate ultrasonic vibration energy level can be predetermined depending on the desired sol formation time.

In this way, starting with a silica powder 5 to 200 millimicrons in ultimate particle size, an acidic sol with a silica concentration of at least 15% by weight can be obtained in a stable state.

This sol has good storage stability and therefore can be used conveniently in various fields of use.

In cases where the pH of the sol need not be low, namely, in cases where the only purpose is to produce a low-alkali metal and/or low-alumina sol, the low-alkali metal, low-alumina silica sol obtained by the above method can be adjusted to pH 7 or higher by addition of ammonia or an organic amine with stirring, to thereby further increase the stability of the sol.

It is to be noted, however, that high concentration silica sols cannot be obtained if the addition of silica powder to water under ultrasonic vibration application is performed while adjusting the pH to above 5 or if a silica powder is added to water, then the pH is increased by addition of aqueous ammonia and thereafter ultrasonic vibrations are applied; the resulting composition will become gel-like and never provide a high concentration silica sol. Therefore, in cases where a further increase in sol stability is obtained by increasing the pH with ammonia, the above-mentioned process of increasing the pH to 7 or higher by addition of ammonia is conducted only after solation at a pH of not higher than 5 under ultrasonic vibration application. When ammonia is added after solation at a pH of not higher than 5, the addition process can be conducted with conventional mechanical stirring, without any difficulty and without any substantial gelation during the process.

The method according to the invention thus produces low-alkali metal, low-alumina, high concentration silica sols in a constant and stable manner in a short period of time.

The silica sols obtained in accordance with the present invention can be used for various purposes. For example, they can be used in preparing catalysts, catalyst carriers, driers, dehydrating agents, adsorbents, coating compositions for various materials, and binders, among others.

Examples of said catalysts are silica catalysts and metal oxide catalysts supported on silica for various reactions such as oxidation, oxidative dehydrogenation, ammoxidation, dehydration, hydration, hydrogenation, addition, disproportionation and polymerization. For instance, U.S. Pat. No. 3,152,170, Japanese Patent Publication No. 19111/1973 and U.S. Pat. Nos. 3,308,151, 4,083,804 and 4,370,279 describe antimony-containing metal oxide catalysts for use in oxidation, oxidative dehydrogenation and ammoxidation for organic compounds. These catalysts are in many instances supported on silica carriers. The silica sols obtained in accordance with the present invention are useful in such instances.

These catalysts comprise compound oxides or solid solutions of antimony and other elements and generally have compositions represented by the following formula:

$$Me_a Sb_b X_c Q_d R_e O_f (SiO_2)_g$$

wherein
Me represents at least one element selected from the group consisting of Fe, Co, Ni, Sn, U, Cr, Cu, Mn, Ti, and Ce;
X represents at least one element selected from the group consisting of V, Mo, and W;
Q represents at least one element selected from the group consisting of Li, Na, K, Rb, Cs, Be, Mg, Ca, Sr, Ba, Y, La, Th, Zr, Hf, Nb, Ta, Cr, Re, Ru, Os, Rh, Ir, Pd, Pt, Ag, Zn, Cd, Al, Ga, In, Tl, Ge, Pb, As, and Se;
R represents at least one element selected from the group consisting of B, P, Te and Bi; and
the suffixes a, b, c, d, e, f and g represent the atomic ratios among the elements and have values within the following respective ranges:
a is from 5 to 15, b is from 5 to 100, c is from 0 (zero) to 15, d is from 0 to 50, e is from 0 to 10, f is a number corresponding to the oxides formed from the above constituent elements, and g is from 5 to 200.

The following examples and comparative examples are further illustrative of the present invention. In all the examples, it was confirmed by an electron microscopy that the silica particles contained in the product silica sols were substantially the same in ultimate particle size as the starting silica powders.

EXAMPLE 1

Purified water (1,200 g) was placed in a 3-liter glass beaker and the pH was adjusted to 2 by addition of a small amount of nitric acid. Thereto was added portionwise 300 g of an amorphous silica powder (sodium content less than 1 ppm; alumina content about 50 ppm) having an ultimate particle size of 16 millimicrons while applying ultrasonic vibrations at a frequency of 45 KHz to the aqueous medium.

The addition of silica powder was carried out over 30 minutes and, after completion of the addition, ultrasonic vibrations were further applied for 30 minutes.

During the addition, the pH was adjusted with nitric acid as necessary to maintain the pH at about 2.

The above procedure gave a low-alkali metal, low-alumina silica sol having a silica concentration of 21.3% by weight, a pH of 2.0, a viscosity of 18 cp (centipoise), an Na$_2$O content of less than 1 ppm and an Al$_2$O$_3$ content of about 10 ppm. After 10 days of storage, the sol retained its stability.

EXAMPLE 2

Purified water (1,125 g) was placed in a 3-liter glass beaker, and a small amount of an amorphous silica powder (sodium content less than 1 ppm; alumina content about 10 ppm) having an ultimate particle size of 40 millimicrons was added, whereupon the pH of the solution became 4. In that condition, the remaining portion of the silica powder was added while applying ultrasonic vibrations at a frequency of 45 KHz. The total weight of the silica powder used amounted to 375 g. During the addition, the pH of the liquid medium did not exceed 4.

The above procedure gave a low-alkali metal, low-alumina silica sol having a silica concentration of 25.1% by weight, a pH of 3.8, a viscosity of 13 cp, an Na$_2$O content of less than 1 ppm and an Al$_2$O$_3$ content of about 3 ppm. The storage stability of the sol was substantially the same as that of the sol of Example 1.

EXAMPLE 3

Purified water (1,200 g) was placed in a 3-liter glass beaker and the pH was adjusted to 1 by addition of nitric acid. Thereto was added portionwise 300 g of an amorphous silica powder (sodium content about 10 ppm; alumina content about 100 ppm) having an ultimate particle size of 7 millimicrons while applying ultrasonic vibrations at a frequency of 25 KHz to the aqueous medium.

During the addition, the pH was adjusted with nitric acid as necessary to maintain the pH at about 1.

The above procedure gave a low-alkali metal, low-alumina silica sol having a silica concentration of 19.2% by weight, a pH of 0.8, a viscosity of 15 cp, an $Na_2O$ content of about 20 ppm and an alumina content of about 20 ppm. The storage stability of the sol was substantially the same as that of the sol of Example 1.

EXAMPLE 4

Purified water (1,200 g) was placed in a 3-liter glass beaker and the pH was made 2 by addition of nitric acid. Thereto was added portionwise 300 g of an amorphous silica powder (sodium content less than 1 ppm; alumina content about 50 ppm) having an ultimate particle size of 12 millimicrons while circulating the aqueous mixture through an ultrasonic homogenizer (Choonpa Kogyo K.K. model UH-8, 19 KHz, 300 W).

The pH was adjusted to about 2 by addition of nitric acid as necessary during the process.

The above procedure gave a low-alkali metal, low-alumina silica sol having a silica concentration of 20.1% by weight, a pH of 2.3, a viscosity of 6 cp, an $Na_2O$ content of less than 1 ppm and an alumina content of about 10 ppm. The storage stability of the sol was substantially the same as that of the sol of Example 1.

EXAMPLE 5

Purified water (1,200 g) was placed in a 3-liter glass beaker and the pH was made 2 by addition of nitric acid. Thereto was added portionwise 300 g of an amorphous silica powder (sodium content less than 10 ppm; alumina content about 100 ppm) having an ultimate particle size of 7 millimicrons while circulating the aqueous phase through the same ultrasonic homogenizer as used in Example 4.

During the addition, the pH was adjusted with nitric acid as necessary to maintain the pH at about 2.

The above procedure gave a low-alkali metal, low-alumina silica sol having a silica concentration of 19.7% by weight, a pH of 2.0, a viscosity of 7 cp, an $Na_2O$ content of less than 1 ppm and an alumina content of about 20 ppm. The storage stability of the sol was substantially the same as that of the sol of Example 1.

EXAMPLE 6

The sol obtained in Example 4 was adjusted to pH 8 by portionwise addition of 15% aqueous ammonia while stirring in a stirrer.

Thus was obtained a low-alkali metal silica sol having a silica concentration of 18.5%, a pH of 8.2, a viscosity of 12 cp, an $Na_2O$ content of less than 1 ppm and an alumina content of about 10 ppm. The sol retained its stability even after 6 months of storage.

COMPARATIVE EXAMPLE 1

The procedure of Example 1 was followed except that no ultrasonic vibrations were applied, but rather stirring was conducted with a stirrer. When an about ⅛ portion of the silica powder had been added, a thixotropic gel formed. Stirring was then continued for 30 minutes but the condition could not be improved, so the process of sol preparation was discontinued.

COMPARATIVE EXAMPLE 2

The procedure of Example 1 was followed except that the ultrasonic waves had a frequency of 200 KHz. When an about ⅛ portion of the silica powder had been added, a thixotropic gel formed. Continued application of ultrasonic vibrations for 20 minutes could not improve the condition, so the procedure for solation was discontinued.

COMPARATIVE EXAMPLE 3

The procedure of Example 1 was followed except that the ultrasonic waves had a frequency of 1,000 KHz. When an about ⅛ portion of the silica powder had been added, the viscosity increased and addition of a further portion of the silica powder resulted in gelation. Continued application of ultrasonic vibrations for 20 minutes could not improve the condition, so the procedure was discontinued.

COMPARATIVE EXAMPLE 4

Purified water (1,200 g) was placed in a 3-liter glass beaker and the pH was made 10 by addition of aqueous ammonia. Thereto was added portionwise an amorphous silica powder having an ultimate particle size of 12 millimicrons while applying ultrasonic vibrations at a frequency of 45 KHz to the aqueous mixture. With the progress of addition, the viscosity increased and at last the mixture became paste-like. The pH then was 5.3. Continued application of ultrasonic vibrations for further 30 minutes could not improve the condition, so the procedure was discontinued.

COMPARATIVE EXAMPLE 5

Purified water (1,200 g) was placed in a 3-liter glass beaker and the pH was made 11 by addition of aqueous ammonia. Thereto was added portionwise an amorphous silica powder having an ultimate particle size of 12 millimicrons while applying thereto ultrasonic vibrations at a frequency of 45 KHz. When an about ⅛ portion of the powder had been added, the viscosity increased and the mixture became gelatin-like. The pH was 8.5. Continued application of ultrasonic vibrations for further 30 minutes failed to improve the condition, so the procedure for solation was discontinued.

The results obtained in the above examples and comparative examples are summarized below in Table 1.

TABLE 1

| Example No. | Ultimate Particle Size of Silica Powder (millimicrons) | Frequency of Ultrasonic Wave Applied (KHz) | pH during Application of Ultrasonic Vibrations | Characteristic Properties of Silica Sol Obtained ||| 
|---|---|---|---|---|---|---|
| | | | | SiO$_2$ Concentration (wt %) | pH (at 25° C.) | Viscosity* (at 25° C.) (cp) |
| Example 1 | 16 | 45 | 2 | 21.3 | 2.0 | 12 |
| Example 2 | 40 | 45 | 4 | 25.1 | 3.8 | 13 |
| Example 3 | 7 | 25 | 1 | 19.2 | 0.8 | 15 |
| Example 4 | 12 | 19 | 2 | 20.1 | 2.3 | 6 |
| Example 5 | 7 | 19 | 2 | 19.7 | 2.0 | 7 |
| Example 6 | 12 | 19 | 2 | 18.5 | 8.2 | 12 |
| Comparative Example 1 | 12 | Mechanical stirring alone | 2 | No sol formation | | |
| Comparative Example 2 | 12 | 200 | 2 | No sol formation | | |
| Comparative Example 3 | 12 | 1,000 | 2 | No sol formation | | |
| Comparative Example 4 | 12 | 45 | 10 → 5.3 | No sol formation | | |
| Comparative Example 5 | 12 | 45 | 11 → 8.5 | No sol formation | | |

Note:
*means values measured with a type B viscometer.

EXAMPLE 7

A catalyst having the experimental formula Fe$_{10}$Sb$_{25}$W$_{0.25}$Te$_{1.0}$O$_{67.8}$(SiO$_2$)$_{30}$ was prepared in the following manner.

(I) A 1.96 kg portion of a metallic antimony powder was taken and slowly added to 7.2 liters of nitric acid (specific gravity 1.38) heated to about 80° C. After confirmation that the antimony has been completely oxidized, the excess nitric acid was removed. The product of nitric acid oxidation of antimony was washed with five 2-liter portions of water and then transferred to a ball mill in which said product was ground for 3 hours.

(II) A 0.358 kg portion of an electrolytic iron powder was taken and slowly added to a mixture of 3 liters of nitric acid (specific gravity 1.38) and 4 liters of water as heated at about 80° C. to thereby dissolve the iron powder in said mixture.

(III) A 41.8 g portion of ammonium paratungstate was taken and dissolved in 2 liters of water.

(IV) A 147 g portion of telluric acid was taken and dissolved in 1 liter of water.

(V) A 5.76 kg portion of silica sol (SiO$_2$ 20%) was taken. This silica sol was prepared in the same manner as in Example 4.

The above components (I) to (V) were mixed together and the mixture is adjusted to pH 2 by gradual addition of aqueous ammonia (15%) with adequate stirring.

The thus-obtained slurry was heated at 100° C. for 4 hours.

The slurry was spray-dried in the conventional manner using a spray drier. The thus-obtained fine spherical particles were calcined at 200° C. for 4 hours, then at 400° C. for 4 hours, and further at 800° C. for 8 hours.

The catalyst prepared in the above manner was packed into a fluidized bed reactor (fluidized catalyst bed size: 2.5 cm in diameter and 40 cm in height) and used in propylene ammoxidation.

The reaction was carried out at ordinary pressure and at a feed ratio of oxygen (supplied as air)/ammonia/propylene=2.2/1.1/1 (mole ratio) and a temperature of 450° C. A propylene conversion of 99% and an acrylonitrile yield of 78% were attained.

While the invention has been described in detail and with reference to specific embodiments thereof, it will be apparent to one skilled in the art that various changes and modifications can be made therein without departing from the spirit and scope thereof.

What is claimed is:

1. A method for producing an aqueous silica sol, comprising admixing a fine silica powder having an ultimate particle size of from 5 to 200 millimicrons, a content of sodium of not more than 500 ppm and a content of alumina of not more than 1000 ppm with an aqueous medium at a pH not higher than 5 while applying ultrasonic vibrations having a frequency within the range of from 10 to 100 kilohertz to the aqueous medium to thereby disperse said silica powder in said aqueous medium and thus convert the mixture into an aqueous sol.

2. A method as in claim 1, wherein the ultrasonic wave has a frequency within the range of from 15 to 50 kilohertz.

3. A method as in claim 2, wherein the concentration of silica in the silica sol formed is at least 15% by weight.

4. A method as in claim 2, wherein the content of sodium in the silica powder is not more than 1 ppm and the content of alumina in the silica powder is not more than 10 ppm.

5. A method as in claim 4, wherein the concentration of silica in the silica sol formed is at least 15% by weight.

6. A method as in claim 4, wherein following conversion of the silica powder to an aqueous sol, said silica sol is adjusted to a pH of not less than 7 by addition of aqueous ammonia or an organic amine to thereby stabilize the sol.

7. A method as in claim 2, wherein following conversion of the silica powder to an aqueous sol, said silica sol is adjusted to a pH of not less than 7 by addition of aqueous ammonia or an organic amine to thereby stabilize the sol.

8. A method as in claim 1, wherein the content of sodium in the silica powder is not more than 1 ppm.

9. A method as in claim 8, wherein the content of alumina in the silica powder is not more than 10 ppm.

10. A method as in claim 9, wherein the concentration of silica in the silica sol formed is at least 15% by weight.

11. A method as in claim 9, wherein following conversion of the silica powder to an aqueous sol, said silica sol is adjusted to a pH of not less than 7 by addition of aqueous ammonia or an organic amine to thereby stabilize the sol.

12. A method as in claim 1, wherein the content of alumina in the silica powder is not more than 10 ppm.

13. A method as in claim 1, wherein the concentration of silica in the silica sol formed is at least 15% by weight.

14. A method as in claim 1, wherein following conversion of the silica powder to an aqueous sol, said silica sol is adjusted to a pH of not less than 7 by addition of aqueous ammonia or an organic amine to thereby stabilize the sol.

15. A method as in claim 1, wherein the ultimate particle size of silica particles occurring in the silica sol formed is substantially equal to the ultimate particle size of the silica powder used as the starting material.

16. A method as in claim 1, wherein the silica powder is a product of (a) oxidative decomposition of ethyl silicate, (b) hydrolysis of silicon tetrachloride, (c) co-combustion of silicon tetrachloride and a combustible gas, or (d) pyrolysis or oxidative degradation of an organic silicon compound.

* * * * *